US012680517B2

(12) United States Patent
Sun et al.

(10) Patent No.: US 12,680,517 B2
(45) Date of Patent: Jul. 14, 2026

(54) SYSTEM AND METHOD FOR BALANCING OUTPUTS FROM MULTIPLE CYLINDER BANKS OF AN INTERNAL COMBUSTION ENGINE

(71) Applicant: Cummins Inc., Columbus, IN (US)

(72) Inventors: Jisang Sun, Columbus, IN (US); Weiyang Lin, Columbus, IN (US); Krishnakanth Muraleedhara Kaimal, Columbus, IN (US); Kevin Martin Beam, Seymour, IN (US); Aiswarya Adusumilli, Columbus, IN (US); David Guillermo Gonzalez Medina, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/720,876

(22) PCT Filed: Dec. 20, 2022

(86) PCT No.: PCT/US2022/082015

§ 371 (c)(1),
(2) Date: Jun. 17, 2024

(87) PCT Pub. No.: WO2023/133035

PCT Pub. Date: Jul. 13, 2023

(65) Prior Publication Data

US 2025/0059928 A1 Feb. 20, 2025

Related U.S. Application Data

(60) Provisional application No. 63/266,524, filed on Jan. 7, 2022.

(51) Int. Cl.
*F02D 41/14* (2006.01)
*F01N 9/00* (2006.01)
*F02D 35/02* (2006.01)

(52) U.S. Cl.
CPC ............ *F02D 41/146* (2013.01); *F01N 9/00* (2013.01); *F02D 35/02* (2013.01); *F02D 41/14* (2013.01);
(Continued)

(58) Field of Classification Search
CPC ........ F02D 41/146; F02D 35/02; F02D 41/14; F02D 41/1446; F02D 41/1448;
(Continued)

(56) References Cited

U.S. PATENT DOCUMENTS 5,983,876 A * 11/1999 Irons .................. F02D 41/1497 123/478
6,092,016 A * 7/2000 Sarangapani ......... F02D 41/222 123/676
(Continued)

FOREIGN PATENT DOCUMENTS

GB 2380428 B 11/2004
WO WO-03058036 A1 * 7/2003 .............. F02B 75/26
(Continued)

OTHER PUBLICATIONS

International Search Report and Written Opinion for International patent application No. PCTUS202282015, filed Dec. 20, 2022, mailed Mar. 29, 2023, 9 pgs.
(Continued)

*Primary Examiner* — Joseph J Dallo
(74) *Attorney, Agent, or Firm* — Taft, Stettinius & Hollister LLP

(57) ABSTRACT

The present disclosure relates to engines with multiple cylinder banks. Systems and methods are disclosed that relate to engine operations that balance the output from the cylinder banks to improve engine health and performance.

22 Claims, 4 Drawing Sheets

(52) U.S. Cl.
CPC ..... *F02D 41/1446* (2013.01); *F02D 41/1448* (2013.01); *F02D 41/1454* (2013.01); *F02D 41/1466* (2013.01)

(58) Field of Classification Search
CPC ............. F02D 41/1454; F02D 41/1466; F02D 41/0082; F02D 41/0085; F02D 41/1444; F02D 35/023; F02D 35/025; F01N 9/00; F01N 13/107; F01N 2430/06; F01N 2560/022; F01N 2560/025; F01N 2560/026; F01N 2560/05; F01N 2560/06; F01N 2560/08; F01N 2570/14; F01N 2900/08; F01N 2900/1402; F01N 2900/1404; F01N 2900/1406; F01N 2900/1411; F02P 5/152
See application file for complete search history.

(56) References Cited

U.S. PATENT DOCUMENTS

| | | | | |
|---|---|---|---|---|
| 6,532,935 | B2 * | 3/2003 | Ganser | F02D 41/0082 123/406.44 |
| 6,571,772 | B1 * | 6/2003 | Ott | F02N 19/00 123/481 |
| 6,694,736 | B2 * | 2/2004 | Pfluger | F02B 37/004 60/612 |
| 6,837,231 | B1 | 1/2005 | Herrin | |
| 9,322,350 | B2 | 4/2016 | Storhok et al. | |
| 10,215,115 | B1 | 2/2019 | Ranga et al. | |
| 10,337,374 | B2 | 7/2019 | Snow et al. | |
| 10,443,475 | B2 * | 10/2019 | Lipa | F01N 3/225 |
| 10,655,592 | B2 | 5/2020 | Dane et al. | |
| 10,662,857 | B2 * | 5/2020 | Palmisani | F01P 3/14 |
| 10,920,687 | B2 | 2/2021 | Hsieh et al. | |
| 10,975,791 | B1 | 4/2021 | Szczepanski | |
| 2002/0023632 | A1 | 2/2002 | Vieser et al. | |
| 2003/0221660 | A1 | 12/2003 | Surnilla et al. | |
| 2005/0193718 | A1 | 9/2005 | Surnilla et al. | |
| 2007/0137284 | A1 * | 6/2007 | Kluth | F02D 35/027 73/35.03 |
| 2009/0013947 | A1 * | 1/2009 | Russ | F01L 1/344 123/90.17 |
| 2009/0018751 | A1 | 1/2009 | Buckland et al. | |
| 2009/0157278 | A1 * | 6/2009 | Mischler | F01M 11/10 701/102 |
| 2010/0222981 | A1 * | 9/2010 | Hacker | F01N 3/225 701/102 |
| 2011/0072893 | A1 * | 3/2011 | Malaczynski | G01M 15/11 73/114.03 |
| 2011/0139118 | A1 * | 6/2011 | Glugla | G01M 15/12 123/436 |
| 2015/0226172 | A1 | 8/2015 | Anton | |
| 2016/0076471 | A1 * | 3/2016 | Bayer | F02D 13/0226 123/90.15 |
| 2018/0003118 | A1 | 1/2018 | zur Loye et al. | |
| 2018/0135541 | A1 | 5/2018 | Hsieh | |
| 2018/0216562 | A1 | 8/2018 | Dudar | |
| 2020/0271063 | A1 * | 8/2020 | Farsch | F02M 35/116 |
| 2021/0079858 | A1 | 3/2021 | Hsieh et al. | |
| 2022/0010741 | A1 * | 1/2022 | Tharakan | F02D 41/0085 |
| 2023/0126002 | A1 * | 4/2023 | Kumar | F02D 41/0087 701/111 |

FOREIGN PATENT DOCUMENTS

| | | | | |
|---|---|---|---|---|
| WO | WO-2020011631 | A1 * | 1/2020 | F02D 13/04 |
| WO | WO-2023133035 | A1 * | 7/2023 | F02D 41/1466 |

OTHER PUBLICATIONS

Extended European Search Report, EP Application No. 22919240.6 Dated Dec. 23, 2025, 9 pgs.

* cited by examiner

SYSTEM AND METHOD FOR BALANCING OUTPUTS FROM MULTIPLE CYLINDER BANKS OF AN INTERNAL COMBUSTION ENGINE

CROSS-REFERENCE TO RELATED APPLICATION

The present application is a national stage application of International Patent Application No. PCT/US22/82015, filed Dec. 20, 2022, which claims priority to U.S. Provisional Application Ser. No. 63/266,524, filed on Jan. 7, 2022, both of which are incorporated herein by reference in their entirety.

BACKGROUND

The present invention relates to internal combustion engines with multiple cylinder banks, and more particularly, but not exclusively, relates to systems and methods for balancing outputs from multiple cylinder banks of an internal combustion engine.

Various systems have been developed to control exhaust emissions from internal combustion engines. For engines with multiple cylinder banks, the overall average engine output may meet desired parameters, but there may be a larger discrepancy in the outputs from one of the cylinder banks as compared to one or more other cylinder banks. This discrepancy between bank-to-bank output can adversely impact engine health and performance. Therefore, further improvements in this technology area are needed.

SUMMARY

There is disclosed in the present application various aspects of unique systems, methods, devices and apparatus to manage operation of an internal combustion engine that includes multiple cylinder banks. In one aspect, there is disclosed an internal combustion engine system including two or more cylinder banks. An output from each cylinder bank is determined. In response to a difference between these outputs, an operating parameter for at least one of the cylinder banks is incremented to reduce the difference between the outputs.

In an embodiment, the output is a NOx value associated with each cylinder bank. In an embodiment, the operating parameter is a spark timing. In an embodiment, the operating parameter is an air-fuel ratio. In an embodiment, the operating parameter is incremented on a cylinder-by-cylinder basis for at least one of the cylinder banks. In an embodiment, the operating parameter is incremented on a cylinder-by-cylinder basis for each of the cylinder banks. In an embodiment, the operating parameter is incremented for all cylinders in each cylinder bank.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION OF REPRESENTATIVE EMBODIMENTS

Figure 1:
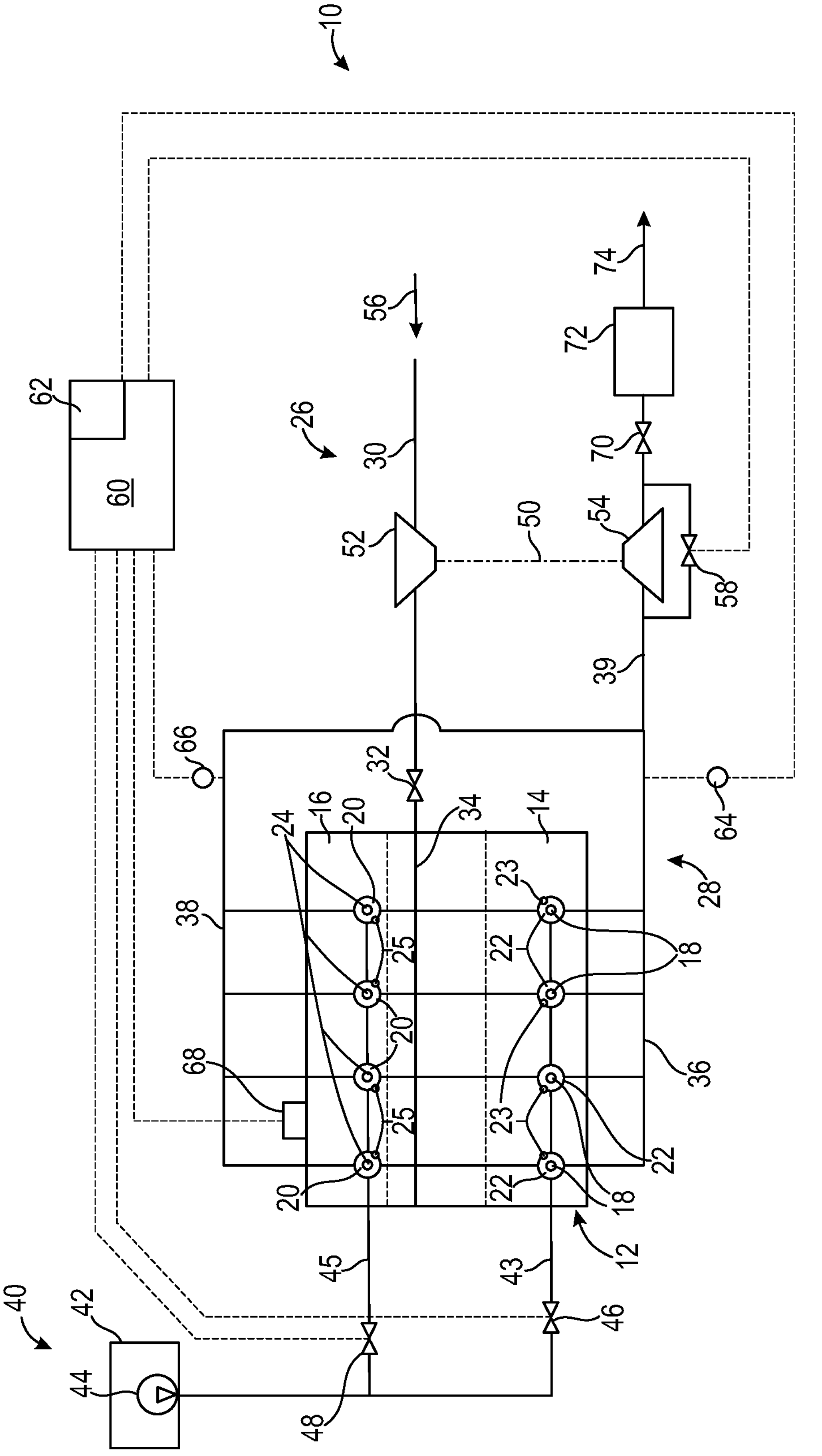
FIG. 1 is a schematic view of a system that includes an internal combustion engine with multiple cylinder banks.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

FIG. 1 shows an internal combustion engine system 10 according to one embodiment of the present application. System 10 includes an internal combustion engine 12 having an intake system 26 and an exhaust system 28. Engine 12 can be any type of engine, and in one specific embodiment is a spark-ignition engine that includes a number of cylinders 18, 20 each housing a piston and combusting a fuel provided to each of the cylinders 18, 20 to produce an exhaust flow 74 from each of the cylinders 18, 20. Engine 12 also includes multiple cylinder banks. In the illustrated embodiment, engine 12 includes first and second cylinder banks 14, 16 each housing at least one cylinder 18, 20, respectively. Engine 12 can be V-type engine with two or more cylinder banks, although other embodiments include in-line cylinder arrangements, a W-type engine, or any engine arrangement with more than cylinder with at least two cylinder banks housing at least one cylinder.

In an embodiment, internal combustion engine system 12 is operated by each of the first and second cylinder banks including at least one cylinder for receiving fuel from a fuel system to combust with air from intake system 26 in at least one of the cylinders 18, 20 of cylinder banks 14, 16. A first output from combustion in the first cylinder bank 14 with a second output from combustion in the second cylinder bank 16. In response to the comparison, an operating parameter in incrementally adjusted in at least one cylinder 18, 20 in at least one of the first and second cylinder banks 14, 16 to reduce a difference between the first output and the second output.

In the illustrated embodiment, engine 12 includes at least one intake manifold 34 fluidly coupled to an outlet of a compressor 52 of a turbocharger 50. Compressor 52 is fluidly coupled with an intake conduit 30. Compressor 52 includes a compressor inlet coupled to intake conduit 30 for receiving fresh air flow 56 from an air inlet (not shown.) System 10 may also include an intake throttle 32 disposed in line with the intake conduit 30 between compressor 52 and intake manifold 34. Optionally, system 10 may include an intake air cooler (not shown) disposed in line with the intake conduit 30 between compressor 52 and intake manifold 34.

Compressor 52 is mechanically coupled to a turbine 54 of turbocharger 50 via a drive shaft. Turbine 54 includes a turbine inlet fluidly coupled to exhaust manifolds 36, 38 of engine 12 via an exhaust conduit 39. Collectively, intake conduit 30, intake manifold 34, first cylinder bank 14, exhaust manifold 36, and exhaust conduit 39 define a first pathway along which gas flows from compressor 52 to turbine 54 during nominal operation of first cylinder bank 14 of engine 12. Collectively, intake conduit 30, intake manifold 34, cylinder bank 16, exhaust manifold 38, and exhaust conduit 39 define a second pathway along which gas flows from compressor 52 to turbine 54 during nominal operation of second cylinder bank 16 of engine 12.

Figure 2:
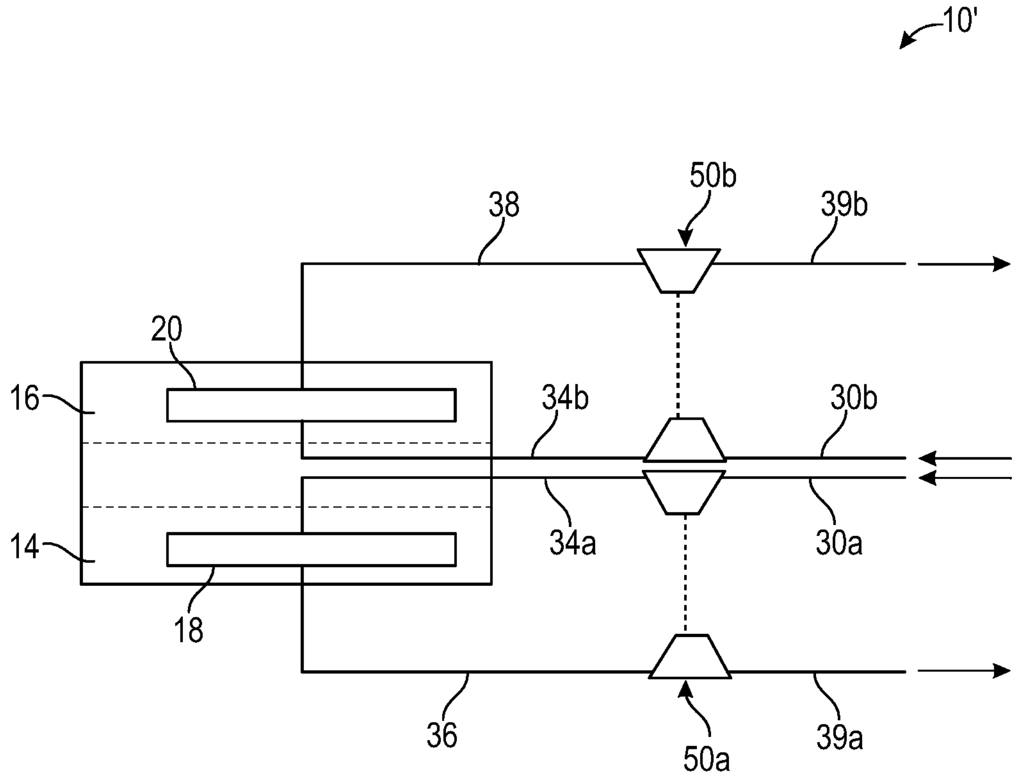
FIG. 2 is a schematic view of another embodiment system that includes an internal combustion engine with multiple cylinder banks.

FIG. 2 shows an alternative embodiment to internal combustion engine system 10, designated as internal combustion engine system 10'. System 10' can be similar to system 10 described herein, and the features of system 10 discussed herein can also be included with system 10'. In contrast to system 10, system 10' includes separate intake manifolds and/or separate exhaust outlets for the cylinder banks 14, 16. For example, first cylinder bank 14 includes cylinders 18 that receive an intake flow from a first intake manifold 34*a*, and second cylinder bank 16 includes cylinders 20 that receive an intake flow from a second intake manifold 34*b*. First cylinder bank 14 produces an exhaust flow to first exhaust manifold 36 that is connected to first exhaust conduit 39*a*, and cylinder bank 16 produces an exhaust flow to second exhaust manifold 38 that is connected to second exhaust conduit 39*b*. A first turbocharger 50*a* includes a first compressor connected to first intake conduit 30*a* and a first turbine connected to first exhaust conduit 39*a*. A second turbocharger 50*b* includes a second compressor connected to second intake conduit 30*b* and a second turbine connected to second exhaust conduit 39*b*.

In either embodiment of system 10, 10', engine 12 is of a reciprocating piston type with four stroke operation, and runs on fuel received by direct injection with spark ignition. More specifically, as schematically represented in FIG. 1, engine 12 includes, for purposes of illustration and not limitation, eight pistons (not shown) that are disposed in cylinders 18, 20 of cylinder banks 14, 16, respectively. The pistons are each connected to a crankshaft by a corresponding connecting rod (not shown) to reciprocally move within the respective cylinder 18, 20 in a standard manner for four stroke engine operation. Each cylinder 18, 20 includes a combustion chamber with appropriate intake and exhaust valves (not shown) that are opened and closed via a camshaft (not shown) and fuel injectors 22, 24, respectively. Fuel injectors 22, 24 can be of a standard type that operate in response to signals from electronic controls described in greater detail hereinafter.

Fuel injectors 22, 24 receive fuel from a fuel system 40 that includes a fuel source 42 in fluid communication therewith. Fuel source 42 can be connected with a fuel pump 44 that provides a flow of fuel to cylinders 18, 20 in response to a fueling command from a controller 60. Fuel injectors 22, 24 can be direct injectors as shown, port injectors, or both. Alternatively or additionally, fuel can be provided at any suitable location along intake system 26, and more than one fuel source can be provided for embodiments of engine 12 that provide for dual fuel operations. In the illustrated embodiment, cylinders 18 of cylinder bank 14 can receive fuel from a first common rail 43, and cylinders 20 can receive fuel from a second common rail 45. Separate fuel control valves 46, 48 can be provided for each of the cylinders banks 14, 16 so that the fueling can be controlled separately to each cylinder bank 14, 16 via a cylinder bank fueling command from controller 60. Alternatively or additionally, each of the injectors 22, 24 can be separately supplied fuel and controlled via fueling commands from controller 60 to selectively admit fuel to the respective cylinder 18, 20. In addition, each of the cylinders 18, 20 may be connected to a same common rail, or a common rail is omitted altogether.

Each cylinder 18, 20 may also include a spark ignition device 23, 25, respectively. Spark ignition devices 23, 25 can be, for example, spark plugs that ignite the fuel-air mixture in the associated combustion chamber. The timing at which the spark ignition devices operate for combustion can be controlled via spark timing commands from controller 60, as discussed further below.

Turbine 54 may include a wastegate 58 as shown, or alternatively a controllable inlet, that is connected to controller 60 to receive control signals that actuate the wastegate 58 between on-off or open-closed positions in response to commands from controller 60. In another embodiment, intake throttle 32 can include actuators that are operably connected to controller 60 to receive control signals that actuate the intake throttle 32 between on-off or open-closed positions in response to commands from controller 60. System 10 may further include an exhaust throttle 70 in exhaust conduit 39 downstream of turbine 54. Alternatively, the exhaust throttle 70 can be upstream of the turbine 54. In another embodiment, multiple turbochargers are provided as shown in FIG. 2 and exhaust throttles and/or wastegates 58 are located in each exhaust conduit 39*a*, 39*b*. In another embodiment, a multiple stage turbocharger is proved and an exhaust throttle is located between the turbines of the turbine stages.

Exhaust system 28 includes an aftertreatment system 72. Aftertreatment system 72 may include a number of devices in the path of exhaust flow 74 to chemically convert and/or remove undesirable constituents from the exhaust stream before discharge into the environment. Examples of such devices include, for example, an oxidation catalyst which is in fluid communication with exhaust flow path via exhaust conduit 39 and is operable to catalyze oxidation of one or more compounds in the exhaust flowing through the exhaust flow path such as, for example, oxidation of unburned hydrocarbons or oxidation of NO to $NO_2$. In another embodiment, exhaust aftertreatment system 72 may further include a particulate filter and/or three-way catalyst in fluid communication with the exhaust flow path and operable to reduce the level of particulates and NOx in exhaust flowing through exhaust conduit 39. Other aftertreatment devices are also contemplated and not precluded.

System 10 includes controller 60 that is generally operable to control and manage operational aspects of engine 12, fuel system 40, and/or ignition devices 23, 25. Controller 60 includes a memory 62 as well as a number of inputs and outputs for interfacing with various sensors, actuators and other components coupled to engine 12, fuel system 40, and ignition devices 23, 25. Controller 60 can be an electronic circuit device comprised of one or more components, including digital circuitry, analog circuitry, or both. Controller 60 may be of a software and/or firmware programmable type; a hardwired, dedicated state machine; or a combination of these. In one embodiment, controller 60 is of a programmable microcontroller solid-state integrated circuit type that includes memory 62 and one or more central processing units. Memory 62 can be comprised of one or more components and can be of any volatile or nonvolatile type, including the solid-state variety, the optical media variety, the magnetic variety, a combination of these, or such different arrangement as would occur to those skilled in the art. Controller 60 can include signal conditioners, signal format converters (such as analog-to-digital and digital-toanalog converters), limiters, clamps, filters, and the like as needed to perform various control and regulation operations described herein. Controller 60, in one embodiment, may be a standard type sometimes referred to as an electronic or engine control module (ECM), electronic or engine control unit (ECU) or the like, that is directed to the regulation and control of overall engine operations. Alternatively, controller 60 may be dedicated to control of just the operations described herein or to a subset of controlled aspects of system 10. In any case, controller 60 preferably includes one or more control algorithms defined by operating logic in the form of software instructions, hardware instructions, dedicated hardware, or the like. These algorithms will be described in greater detail hereinafter, for controlling operation of various aspects of system 10.

Controller 60 includes a number of inputs for receiving signals from various sensors or sensing systems associated with elements of system 10. While various sensor and sensor inputs are discussed herein, it should be understood that other sensor and sensor inputs are possible. Furthermore, one or more sensors and sensor inputs discussed herein may not be required. The operative interconnections of controller 60 and elements of system 10 may be implemented in a variety of forms, for example, through input/output interfaces coupled via wiring harnesses, a datalink, a hardwire or wireless network and/or a lookup from a memory location. In other instances all or a portion of the operative interconnection between controller 60 and an element of system 10 may be virtual. For example, a virtual input indicative of an operating parameter may be provided by a model implemented by controller 60 or by another controller which models an operating parameter based upon other information.

In an embodiment, system 10 includes first and second output sensors 64, 66 electrically connected to controller 60 via respective signal paths. In one embodiment, output sensors 64, 66 are NOx sensors operable to determine a NOx amount output from the respective cylinder banks 14, 16. Other embodiments contemplate other types of output sensors 64, 66, such as lambda sensors, oxygen sensors, knock sensors, pressure sensors, exhaust oxygen sensors, particulate matter/particulate number sensors, carbon dioxide sensors, knock sensors, exhaust temperature sensors, exhaust pressure sensors, turbine speed sensors, to name a few. Output sensors may also be provided to sense ignition component parameters, such as breakdown voltage, ignition temperature, etc. First and second output sensors 64, 66 may be located upstream of the turbine 54, such as shown in FIG. 1, or located downstream of the turbine(s), such as downstream of the turbines of turbochargers 50*a*, 50*b* in FIG. 2. System 10 may also include, for example, engine sensor(s) 68 electrically connected to controller 60 via another signal path. Engine sensor(s) 68 may detect any one or more operating parameters of engine 12, such as an in-cylinder combustion parameter including an air-fuel ratio, spark timing, in-cylinder pressure, in-cylinder temperature, knock, etc.

System 10 may further include various sensors not shown, such as intake manifold temperature sensors disposed in fluid communication with the intake manifold 34 (or intake manifolds 34*a*, 34*b*) of engine 12. Intake manifold temperature sensors may be of known construction, and operable to produce a temperature signal indicative of the temperature of air charge flowing into the intake manifold(s). System 10 may further include an intake manifold pressure sensor disposed in fluid communication with intake manifold 34 (or intake manifolds 34*a*, 34*b*) operable to produce a pressure signal indicative of air pressure within intake manifold(s). System 10 may also include exhaust manifold pressure sensors disposed in fluid communication with exhaust manifolds 36, 38 that are operable to produce pressure signal indicative of gas pressure within exhaust manifolds 36, 38. System 10 may also include any output sensor operable to produce a signal indicative of an output of the cylinder banks 14, 16.

Other control mechanisms included within system 10 include electronically controllable flow control valves 46, 48 and/or fuel pump 44 of fuel system 40. Controller 60 is operable to control flow control valves 46, 48, fuel pump 44, injectors 22, 24, and/or spark ignition devices 23, 25, to control the amount of fuel and/or spark timing to individual ones of the cylinders 18, 20. The amount of fuel and/or sparking timing to all the cylinders in respective ones of cylinder banks 14, 16 can also or alternatively be controlled. Furthermore, controller 60 can direct the withholding of fuel from one or more of cylinders 18, 20 for a desired period of time.

As discussed further below, controller 60 is operable to adjusting one or more operating parameters, such as differentially fueling and/or differential timing ignition in at least one of the cylinder banks 14, 16 to satisfy a torque request to engine 12 while producing a desired output from one or both of the cylinder banks 14, 16 to balance bank-to-bank conditions. Balancing of outputs from cylinder banks 14, 16 can improve engine health and performance, such as by reducing or avoiding misfire due to bank-to-bank discrepancies.

The schematic flow diagram and related description which follows provides an illustrative embodiment of performing procedures for managing operation of engine 12 to balance outputs from cylinder banks 14, 16. Operations illustrated are understood to be exemplary only, and operations may be combined or divided, and added or removed, as well as re-ordered in whole or part. Certain operations illustrated may be implemented by a computer such as controller 60 executing a computer program product on a computer readable medium, where the computer program product comprises instructions causing the computer to execute one or more of the operations, or to issue commands to other devices to execute one or more of the operations.

Figure 3:
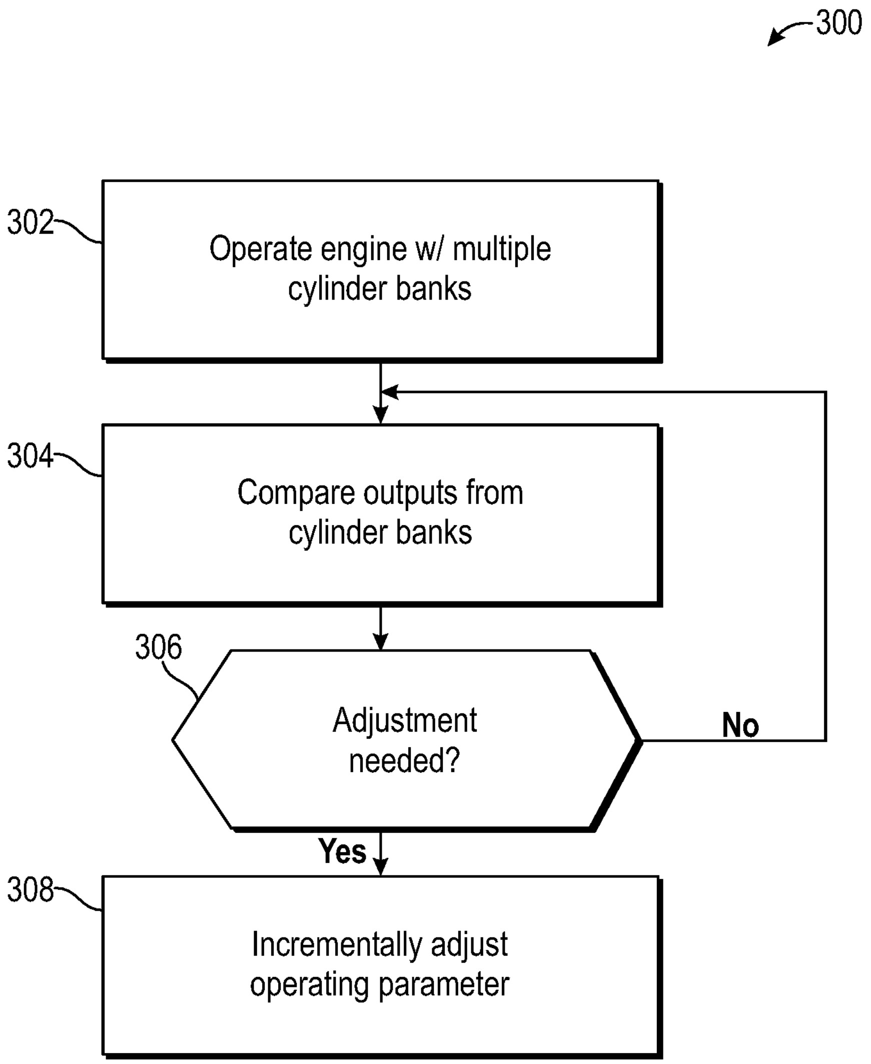
FIG. 3 is a flow diagram of a procedure for controlling outputs from cylinder banks of the internal combustion engine of FIG. 1.

FIG. 3 illustrates one embodiment a bank-to-bank balancing method or procedure 300 in flowchart form, which can be implemented with system 10, 10' using appropriate operating logic executed by controller 60. For example, procedure 300 includes an operation 302 to operate an engine with multiple cylinder banks, such as engine 12 with cylinder banks 14, 16. Method 300 includes an operation 304 to compare a first output from combustion in the first cylinder bank 14 with a second output from combustion in the second cylinder bank 16. At conditional 306, method 300 includes determining if an adjustment in the output of one or both cylinder banks 14, 16 is needed in response to the comparison at operation 304. If conditional 306 is NO, method 300 returns to operation 304 to continue to monitor for adjustment conditions. If conditional 306 is YES, method 300 continues at operation 308 to incrementally adjust an operating parameter of at least one cylinder of at least one of the first and second cylinder banks 14, 16 to reduce a difference between the first output and the second output, improving the balance between outputs from cylinder banks 14, 16.

In an embodiment, operation 304 is not initiated until engine 12 is in a steady-state or non-transient operating condition. In an embodiment, the first and second outputs are NOx values from first and second cylinder banks 14, 16. In an embodiment, operation 304 includes determining the difference between the first output from first output sensor 64 and the second output from second NOx sensor 66 is greater than a first threshold amount. The first threshold amount can be, for example, an absolute difference between the output value from one of, or each, sensor 64, 66 and the average output value from the sensors 64, 66. In an embodiment, conditional 306 requires the absolute difference to be more a pre-determined percentage of the average output from sensor 64, 66 before proceeding to operation 308.

In an embodiment, operation 308 includes incrementally adjusting the operating parameter continues until the difference between the outputs from the cylinder banks 14, 16 is less than a second threshold amount. In an embodiment, the second threshold is less than the first threshold amount. In an embodiment, operation 308 includes incrementally adjusting the operating parameter in each of the first and second cylinder banks 14, 16 in an opposite direction from one another until the difference between the outputs from cylinder banks 14, 16 is less than a desired second threshold amount.

In an embodiment, the operating parameter that is incrementally adjusted at operation 308 is a sparking timing in at least one cylinder 18, 20 of at least one of the first and second cylinder banks 14, 16. In an embodiment, the operating parameter that is incrementally adjusted is a sparking timing in at least one cylinder 18, 20 of each of the first and second cylinder banks 14, 16. In embodiment, the operating parameter that is incrementally adjusted includes advancing the spark timing in at least one cylinder 18 of the first cylinder bank 14 and retarding of the spark timing in at least one cylinder 20 of the second cylinder bank 16. In an embodiment, the incremental adjustment in the spark timing is limited. For example, the incremental adjustment amount can be limited to an increment of plus or minus 1 degree of spark timing.

In an embodiment, the operating parameter that is incrementally adjusted at operation 308 is an air-fuel ratio in the at least one cylinder 18, 20 of at least one of the first and second cylinder banks 14, 16. In an embodiment, the air-fuel ratio in at least one cylinder 18, 20 of each of the first and second cylinder banks 14, 16 is incrementally adjusted at operation 308. In an embodiment, the incremental adjustment at operation 308 includes increasing the air-fuel ratio in at least one cylinder 18 of the first cylinder bank 14 and decreasing the air-fuel ratio in the at least one cylinder 20 of the second cylinder bank 16.

In an embodiment, operation 304 includes determining the difference between the first output and the second output from the first and second cylinder banks 14, 16. The first and second outputs from sensors associated with the cylinder banks 14, 16 may be one or more of: NOx values, exhaust oxygen values, particulate mass and/or particulate number values, carbon dioxide values, knock values, exhaust temperature values, exhaust pressure values, turbine speed values, breakdown voltage values, and/or ignition temperature values. In an embodiment, one or more of the operating parameters is incrementally adjusted at operation 308 on a cylinder-by-cylinder basis of each of the first and second cylinder banks 14, 16 to reduce a difference between the values of the first and second outputs associated with one or more of these values. In an embodiment, the incremental adjustment at operation 308 occurs via the first cylinder bank 14 and the second cylinder bank 16 to reduce a difference between the values of first and second outputs associated with one or more of these values.

Figure 4:
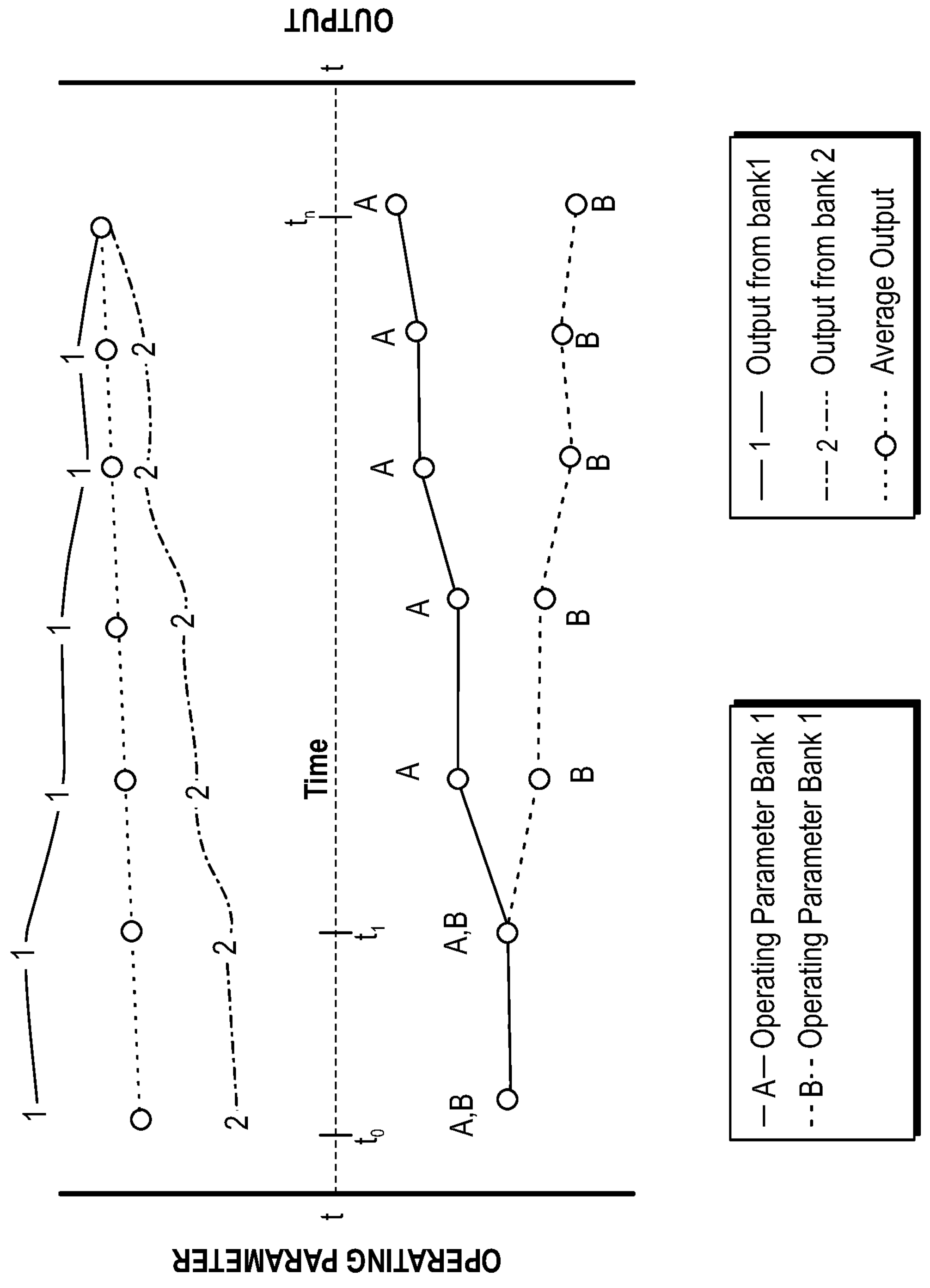
FIG. 4 is a chart showing operating parameter adjustments for each cylinder bank and resulting outputs from each cylinder bank.

FIG. 4 illustrates one embodiment of the incremental adjustment of the operating parameter in cylinder banks 14, 16. For example, initially at time to the operating parameter in cylinder banks 14, 16 is the same, as indicated at point A, B. However, the difference between the outputs in cylinder banks 14, 16 from the average output from the cylinder banks 14, 16 is large, as indicated by points 1, 2 at times $t_0$ and $t_1$. The operating parameter for each cylinder bank 14, 16 is incrementally adjusted in opposite directions at various points along time t until the outputs 1, 2 converge at time $t_n$. As discussed above, it is also contemplated that the operating parameter in only one of the cylinder banks 14, 16 is adjusted incrementally until time $t_n$. In addition or alternatively, the operating parameter may be adjusted in all of the cylinders 18, 20 of at least one of the cylinder banks 14, 16. In addition or alternatively, the operating parameter may be adjusted in a subset of the cylinders 18, 20 in at least one of the respective cylinder banks 14, 16.

Several aspects and embodiments of the present disclosure are envisioned, as recited in the claims appended hereto. According to one aspect of the present disclosure, a method includes operating an internal combustion engine system including an engine with first and second cylinder banks, where each of the first and second cylinder banks including at least one cylinder for receiving fuel from a fuel system to combust with air from an intake system. The method further includes comparing a first output from combustion in the first cylinder bank with a second output from combustion in the second cylinder bank, and, in response to the comparison, incrementally adjusting an operating parameter of the at least one cylinder in at least one of the first and second cylinder banks to reduce a difference between the first output and the second output.

In an embodiment of the method, comparing the first output and the second output includes determining a difference between the first output and the second output is greater than a first threshold amount. In a further embodiment, incrementally adjusting the operating parameter includes incrementally adjusting the operating parameter until the difference is less than a second threshold amount. In still a further embodiment, the second threshold amount is less than the first threshold amount.

In an embodiment, the method includes incrementally adjusting the operating parameter in the at least one cylinder of each of the first and second cylinder banks in opposite directions from one another.

In an embodiment of the method, the first output and the second output are NOx values. In an embodiment, the first output and the second output are one of: exhaust oxygen values, particulate mass and/or particulate number values, carbon dioxide values, knock values, exhaust temperature values, exhaust pressure values, turbine speed values, breakdown voltage values, and ignition temperature values.

In an embodiment, the operating parameter is a sparking timing in the at least one cylinder of at least one of the first and second cylinder banks. In an embodiment, the operating parameter is an air-fuel ratio in the at least one cylinder of at least one of the first and second cylinder banks.

In an embodiment of the method, the operating parameter is a sparking timing in the at least one cylinder of each of the first and second cylinder banks. In a further embodiment, incrementally adjusting the operating parameter includes advancing the spark timing in the at least one cylinder of the first cylinder bank and retarding the spark timing in the at least one cylinder of the second cylinder bank.

In an embodiment of the method, the operating parameter is an air-fuel ratio in the at least one cylinder of each of the first and second cylinder banks. In a further embodiment, incrementally adjusting the operating parameter includes increasing the air-fuel ratio in the at least one cylinder of the first cylinder bank and decreasing the air-fuel ratio in the at least one cylinder of the second cylinder bank.

According to another aspect of the present disclosure, an internal combustion engine system is provided. The system includes an internal combustion engine with a plurality of cylinders. The plurality of cylinders define at least a first cylinder bank and a second cylinder bank of the internal combustion engine. The system also includes a fuel system configured to fuel the first and second cylinder banks, an intake system configured to provide air flow to the plurality of cylinders, and an exhaust system to receive an exhaust flow from the first and second cylinder banks. The system further includes a first sensor operable to provide a first signal indicative of a first output from the first cylinder bank, a second sensor operable to provide a second signal indicative of a second output from the second cylinder bank, and a controller configured to receive the first and second signals from the first and second sensors. The controller is configured to compare the first output from the first cylinder bank with the second output from the second cylinder bank and, in response to the comparison, incrementally adjust an operating parameter of at least one cylinder of at least one of the first and second cylinder banks to reduce a difference between the first output and the second output.

In an embodiment of the system, the intake system includes a first intake manifold configured to distribute the air flow to the first cylinder bank, and a second intake manifold configured to distribute the air flow to the second cylinder bank.

In an embodiment of the system, the exhaust system includes a first exhaust manifold configured to receive exhaust flow from the first cylinder bank, and a second exhaust manifold configured to receive exhaust flow from the second cylinder bank.

In an embodiment of the system, the controller is configured to determine a difference between the first output and the second output is greater than a first threshold amount, and incrementally adjust the operating parameter until the difference is less than a second threshold amount.

In an embodiment of the system, the controller is configured to incrementally adjust the operating parameter in at least one cylinder of each of the first and second cylinder banks in an opposite direction from one another.

In an embodiment of the system, the first output and the second output are NOx values. In an embodiment, the first output and the second output are one of: exhaust oxygen values, particulate mass and/or particulate number values, carbon dioxide values, knock values, exhaust temperature values, exhaust pressure values, turbine speed values, breakdown voltage values, and ignition temperature values.

In an embodiment of the system, the operating parameter is a sparking timing in at least one cylinder of at least one of the first and second cylinder banks. In an embodiment of the system, the operating parameter is an air-fuel ratio in at least one cylinder of at least one of the first and second cylinder banks.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method, comprising:

operating an internal combustion engine system including an engine with first and second cylinder banks, each of the first and second cylinder banks including a plurality of cylinders for receiving fuel from a fuel system to combust with air from an intake system;

comparing a first output from combustion in the first cylinder bank with a second output from combustion in the second cylinder bank; and in response to the comparison, incrementally adjusting an operating parameter on a cylinder-by-cylinder basis for all or a subset of the plurality of cylinders in at least one of the first and second cylinder banks to reduce a difference between the first output and the second output.

2. The method of claim 1, wherein comparing the first output and the second output includes determining a difference between the first output and the second output is greater than a first threshold amount.

3. The method of claim 2, wherein incrementally adjusting the operating parameter includes incrementally adjusting the operating parameter until the difference is less than a second threshold amount.

4. The method of claim 3, wherein the second threshold amount is less than the first threshold amount.

5. The method of claim 1, further comprising incrementally adjusting the operating parameter on a cylinder-by-cylinder basis for only subsets of the plurality of cylinders in each of the first and second cylinder banks in opposite directions from one another until the difference between the first output and the second output is reduced to less than a threshold amount.

6. The method of claim 1, wherein the first output and the second output are NOx values.

7. The method of claim 1, wherein the first output and the second output are one of: exhaust oxygen values, particulate mass and/or particulate number values, carbon dioxide values, knock values, exhaust temperature values, exhaust pressure values, turbine speed values, breakdown voltage values, and ignition temperature values.

8. The method of claim 1, wherein the operating parameter is a sparking timing that is adjusted on the cylinder-by-cylinder basis in at least one of the first and second cylinder banks until the difference between the first output and the second output is reduced to less than a threshold amount.

9. The method of claim 1, wherein the operating parameter is a sparking timing that is adjusted on the cylinder-by-cylinder basis of each of the first and second cylinder banks until the difference between the first output and the second output is reduced to less than a threshold amount.

10. The method of claim 9, wherein incrementally adjusting the operating parameter includes advancing the spark timing on the cylinder-by-cylinder basis in the first cylinder bank and retarding the spark timing on the cylinder-by-cylinder basis of the second cylinder bank.

11. The method of claim 1, wherein the operating parameter is an air-fuel ratio that is adjusted on the cylinder-by-cylinder basis in at least one of the first and second cylinder banks.

12. The method of claim 1, wherein the operating parameter is an air-fuel ratio that is adjusted on the cylinder-by-cylinder basis in each of the first and second cylinder banks.

13. The method of claim 11, wherein incrementally adjusting the operating parameter includes increasing the air-fuel ratio on the cylinder-by-cylinder basis in the first cylinder bank and decreasing the air-fuel ratio on the cylinder-by-cylinder basis in the second cylinder bank.

14. An internal combustion engine system, comprising:

an internal combustion engine with a a first cylinder bank and a second cylinder bank, each of the first cylinder bank and the second cylinder bank including a plurality of cylinders of the internal combustion engine;

a fuel system configured to fuel the first and second cylinder banks;

an intake system configured to provide air flow to the plurality of cylinders;

an exhaust system to receive an exhaust flow from the first and second cylinder banks;

a first sensor operable to provide a first signal indicative of a first output from the first cylinder bank and a second sensor operable to provide a second signal indicative of a second output from the second cylinder bank; and a controller configured to receive the first and second signals from the first and second sensors, the controller further being configured to compare the first output from the first cylinder bank with the second output from the second cylinder bank and, in response to the comparison, incrementally adjust an operating parameter on a cylinder-by-cylinder basis for all or a subset of the plurality of cylinders in at least one of the first and second cylinder banks to reduce a difference between the first output and the second output.

15. The system of claim 14, wherein the intake system includes:

a first intake manifold configured to distribute the air flow to the first cylinder bank; and a second intake manifold configured to distribute the air flow to the second cylinder bank.

16. The system of claim 14, wherein the exhaust system includes:

a first exhaust manifold configured to receive exhaust flow from the first cylinder bank; and a second exhaust manifold configured to receive exhaust flow from the second cylinder bank.

17. The system of claim 14, wherein the controller is configured to:

determine a difference between the first output and the second output is greater than a first threshold amount; and incrementally adjust the operating parameter until the difference is less than a second threshold amount.

18. The system of claim 14, wherein the controller is configured to incrementally adjust the operating parameter for only subsets of the plurality of cylinders in each of the first and second cylinder banks in an opposite direction from one another until the difference between the first output and the second output is reduced to less than a threshold amount.

19. The system of claim 14, wherein the first output and the second output are NOx values.

20. The system of claim 14 wherein the first output and the second output are one of: exhaust oxygen values, particulate mass and/or particulate number values, carbon dioxide values, knock values, exhaust temperature values, exhaust pressure values, turbine speed values, breakdown voltage values, and ignition temperature values.

21. The system of claim 14, wherein the operating parameter is a sparking timing that is adjusted on the cylinder-by-cylinder basis of at least one of the first and second cylinder banks until the difference between the first output and the second output is reduced to less than a threshold amount.

22. The system of claim 14, wherein the operating parameter is an air-fuel ratio that is adjusted on the cylinder-by-cylinder basis of at least one of the first and second cylinder banks until the difference between the first output and the second output is reduced to less than a threshold amount.

* * * * *